(12) United States Patent
Jain et al.

(45) Date of Patent: Dec. 23, 2014
(10) Patent No.: US 8,917,594 B2

(54) LINK LAYER RESERVATION OF SWITCH QUEUE CAPACITY

(75) Inventors: Vinit Jain, Austin, TX (US); James F. Macon, Jr., Raleigh, NC (US); Vijoy A. Pandey, San Jose, CA (US); Renato J. Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/472,248

(22) Filed: May 15, 2012

(65) Prior Publication Data
US 2012/0230196 A1 Sep. 13, 2012

Related U.S. Application Data

(63) Continuation of application No. 13/043,798, filed on Mar. 9, 2011.

(51) Int. Cl.
| | |
|---|---|
| H04L 1/00 | (2006.01) |
| H04L 12/26 | (2006.01) |
| H04J 1/16 | (2006.01) |
| H04J 3/14 | (2006.01) |
| H04L 12/825 | (2013.01) |
| H04L 12/913 | (2013.01) |
| H04L 12/54 | (2013.01) |
| H04L 12/911 | (2013.01) |

(52) U.S. Cl.
CPC ............ *H04L 47/724* (2013.01); *H04L 47/263* (2013.01); *H04L 12/5695* (2013.01); *Y02B 60/43* (2013.01); *H04L 47/72* (2013.01)
USPC ......... 370/229; 370/230; 370/230.1; 370/233

(58) Field of Classification Search
CPC ..... H04L 47/724; H04L 47/72; H04L 47/263; H04L 12/5695; H04L 12/5696; H04L 12/56; H04L 47/26

USPC .............. 370/229, 230, 230.1, 231, 232, 233, 370/234, 235, 235.1, 236, 351, 352, 389, 370/390, 392; 709/223, 224, 230, 231, 232, 709/238
See application file for complete search history.

(56) References Cited

U.S. PATENT DOCUMENTS

| | | | | |
|---|---|---|---|---|
| 6,041,038 A | * | 3/2000 | Aimoto | 370/229 |
| 6,745,246 B1 | * | 6/2004 | Erimli et al. | 709/238 |

(Continued)

FOREIGN PATENT DOCUMENTS

| | | |
|---|---|---|
| EP | 2247037 A1 | 11/2010 |
| JP | 20020223223 A | 8/2002 |
| JP | 2007274467 A | 10/2007 |

OTHER PUBLICATIONS 802.1Qat, "Virtual Bridged Local Area Networks: Amendment 14: Stream Reservation Protocol (SRP)", Sep. 2010, IEEE, all pages.*

(Continued)

*Primary Examiner* — Kwang B Yao
*Assistant Examiner* — Adam Duda
(74) *Attorney, Agent, or Firm* — Russell Ng PLLC; Matthew Baca

(57) ABSTRACT

A network switch, in response to receipt from a source station of a Layer 2 reservation request, establishes a reservation for capacity of an ingress queue of the network switch for a data flow of the source station. In response to a queue overrun condition on the ingress queue of the network switch while the reservation is active, the network switch preserves data frames in the data flow of the source station transmitted pursuant to the reservation and discards other data frames.

9 Claims, 10 Drawing Sheets

| QRsv Request TLV ||||||
|---|---|---|---|---|---|
| Type 800 | Length 802 | Organizationally unique identifier (OUI) 804 | Organizationally defined subtype 806 | Organizationally defined information string 808 ||
| 127 | 14 -- for unified flow for source  30 -- if multiple flows for source | 24 bits (defined by org) | 1 -- QRsv request to proximate switch for unified data flow  3 -- QRsv request for end-to-end QRsv for unified data flow  11 -- QRsv request for proximate switch for one of multiple data flows  13 -- QRsv request for end-to-end QRsv for one of multiple data flows | QRsrv Request Bytes (4 octets) Frames (4 octets) Opt. Flow info (16 octets) ||

800

(56) References Cited

U.S. PATENT DOCUMENTS

| | | | |
|---|---|---|---|
| 6,977,896 B1* | 12/2005 | Kobayashi | 370/235 |
| 7,653,047 B2 | 1/2010 | Lee | |
| 2010/0054129 A1 | 3/2010 | Kuik et al. | |

OTHER PUBLICATIONS

P802.1Qat/D4.1, "Draft IEEE Standard for Local and Metropolitan Area Networks—Virtual Bridged Local Area Networks—AMendment XX: Stream Reservation Protocol (SRP)", Nov. 18, 2009, IEEE, all pages.*

P802.1Qat/D4.1, "Draft IEEE Standard for Local and Metropolitan Area Networks—Virtual Bridged Local Area Networks—AMendment XX: Stream Reservation Protocol (SRP)", Apr. 23, 2010, IEEE, all pages.*

Finn, "The Bridge Queue Placement Problem", Nov. 2007, Cisco Systems, all pages.*

Rexford, "Switches and Bridges", 2009, Princeton, all pages.*

GB Application GB1316080.9; United Kingdom Intellectual Property Office; Examination Report dated Oct. 10, 2013 (3 pp).

Haas et al.; Creating Advanced Functions on Network Processors: Experience and Perspectives; IBM Research, Zurich Research Laboratory, Switzerland and IBM Corporation, RTP, NC, US Apr. 14, 2003 19 pp.

Jaeger et al.; "Integrating Active Networking and Commercial Grade Routing Platforms"; Proceedings of the Special Workshop on Intelligence at the Network Edge, San Francisco, CA US Mar. 20, 2000; 10 pp.

Tripathi et al.; "Crossbow: A Vertically Integrated QoS Stack"; WREN '09, Barcelona Spain, Aug. 21, 2009 9 pp.

Int'l Application PCT/IB2012/050689; Int'l Search Report and Written Opinion dated Apr. 3, 2012.

U.S. Appl. No. 13/043,798 entitled ""; Final office action dated Dec. 3, 2013.

U.S. Appl. No. 13/043,798 entitled ""; Non-Final office action dated Apr. 25, 2014.

U.S. Appl. No. 13/043,798 entitled ""; Non-Final office action dated Aug. 7, 2013.

* cited by examiner

LLDP Ethernet frame structure 700

| Preamble 700 | Dest. MAC 702 | Src MAC 704 | Ethertype 704 | Chassis ID TLV 706 | Port ID TLV 708 | TTL TLV 710 | Optional TLV 712 | End of LLDPDU TLV 714 | Frame Check 716 |
|---|---|---|---|---|---|---|---|---|---|
| | 01:80:C2: 00:00:0E or Dest station addr. | Src station addr. | 0x88CC | Type= 1 | Type= 2 | Type= 3 | Zero or more complete TLVs | Type=0, Length=0 | |

Figure 7

| Type 800 | Length 802 | QRsv Request TLV | |
|---|---|---|---|
| | | Organizationally unique identifier (OUI) 804 | Organizationally defined subtype 806 | Organizationally defined information string 808 |
| 127 | 14 -- for unified flow for source<br>30 -- if multiple flows for source | 24 bits (defined by org) | 1 -- QRsv request to proximate switch for unified data flow<br>3 -- QRsv request for end-to-end QRsv for unified data flow<br>11 -- QRsv request for proximate switch for one of multiple data flows<br>13 -- QRsv request for end-to-end QRsv for one of multiple data flows | QRsrv Request<br>Bytes (4 octets)<br>Frames (4 octets)<br>Opt. Flow info (16 octets) |

| Type 900 | Length 902 | Organizationally unique identifier (OUI) 904 | Organizationally defined subtype 906 | Organizationally defined information string 908 |
|---|---|---|---|---|
| 127 | 18 -- if from switch proximate source for unified flow<br>14 -- if from far end switch for unified flow<br>32 -- if from switch proximate source for one of multiple flows<br>34 -- if from far end switch for one of multiple flows | 24 bits (defined by org) | 2 -- QRsv response from proximate switch for unified flow<br>5 -- QRsv response from far end switch for unified flow<br>12 -- QRsv response from proximate switch for one of multiple flows<br>15 -- QRsv response from far end switch for one of multiple flows | Reservation Granted<br>Bytes (4 octets)<br>Frames (4 octets)<br>Expire Timer (4 octets)<br>Opt. flow info (16 octets) |

QRsv Response TLV

*Figure 9*

| | | QRsv Request TLV | | |
|---|---|---|---|---|
| Type 1000 | Length 1002 | Organizationally unique identifier (OUI) 1004 | Organizationally defined subtype 1006 | Organizationally defined information string 1008 |
| 127 | 18 – if switch forwarded QRsv request for unified flow<br>34 – if switch forwarded QRsv request for one of multiple flows | 24 bits (defined by org) | 4 – for end-to-end QRsv request for unified data flow<br>14 – for end-to-end QRsv request for one of multiple data flows | Reservation Granted Bytes (4 octets)<br>Frames (4 octets)<br>Expire Timer (4 octets)<br>Opt. flow info (16 octets) |

LINK LAYER RESERVATION OF SWITCH QUEUE CAPACITY

The present application is a continuation of U.S. patent application Ser. No. 13/043,798, filed Mar. 9, 2011, entitled "LINK LAYER RESERVATION OF SWITCH QUEUE CAPACITY," the disclosure of which is hereby incorporated herein by reference in its entirety for all purposes.

BACKGROUND OF THE INVENTION

1. Technical Field

The present invention relates in general to network communication and, in particular, to the reservation of switch queue capacity in a communication network.

2. Description of the Related Art

As is known in the art, network communication is commonly premised on the well known seven layer Open Systems Interconnection (OSI) model, which defines the functions of various protocol layers while not specifying the layer protocols themselves. The seven layers, sometimes referred to herein as Layer 7 through Layer 1, are the application, presentation, session, transport, network, data link, and physical layers, respectively.

At a source station, data communication begins when data is received from a source process at the top (application) layer of the stack of functions. The data is sequentially formatted at each successively lower layer of the stack until a data frame of bits is obtained at the data link layer. Finally, at the physical layer, the data is transmitted in the form of electromagnetic signals toward a destination station via a network link. When received at the destination station, the transmitted data is passed up a corresponding stack of functions in the reverse order in which the data was processed at the source station, thus supplying the information to a receiving process at the destination station.

The principle of layered protocols, such as those supported by the OSI model, is that, while data traverses the model layers vertically, the layers at the source and destination stations interact in a peer-to-peer (i.e., Layer N to Layer N) manner, and the functions of each individual layer are performed without affecting the interface between the function of the individual layer and the protocol layers immediately above and below it. To achieve this effect, each layer of the protocol stack in the source station typically adds information (in the form of an encapsulated header) to the data generated by the sending process as the data descends the stack. At the destination station, these encapsulated headers are stripped off one-by-one as the frame propagates up the layers of the stack until the decapsulated data is delivered to the receiving process.

The physical network coupling the source and destination stations may include any number of network nodes interconnected by one or more wired or wireless network links. The network nodes commonly include hosts (e.g., server computers, client computers, mobile devices, etc.) that produce and consume network traffic, switches, and routers. Conventional network switches interconnect different network segments and process and forward data at the data link layer (Layer 2) of the OSI model. Switches typically provide at least basic bridge functions, including filtering data traffic by Layer 2 Media Access Control (MAC) address, learning the source MAC addresses of frames, and forwarding frames based upon destination MAC addresses. Routers, which connect different networks at the network (Layer 3) of the OSI model, typically implement network services such as route processing, path determination and path switching.

In conventional computer networks implementing layered communication protocols, reliability of data connections has been the province of higher layer protocols (i.e., Layer 4 and above). For example, if the capacity of a switch's ingress port to handle incoming data frames is overrun by the source station coupled to that ingress port, the switch silently discards the incoming frames that cannot be handled, and transport (Layer 4) and higher layer protocols are relied upon to detect packet loss and perform recovery operations, if necessary. If the data communication between the source and destination stations does not tolerate packet loss, the processing required to throttle the sending process at the source station and to recover and retransmit the lost packets can impose a significant computational burden on the network nodes supporting the data communication, and especially on the host of the source station.

In an attempt to reduce the computational burden on network nodes associated with packet recovery, the Internet Engineering Task Force developed the Resource Reservation Protocol (RSVP) described in IETF RFC 2205 and its extension, the RSVP-Traffic Engineering (TE) protocol described in IETF RFCs 3209 and 5151. RSVP and its extension RSVP-TE are transport layer (Layer 4) protocols that can be employed by either hosts or routers to reserve network layer resources across a network to enable delivery of integrated services by application data streams over the Internet at specific levels of quality of service (QoS).

SUMMARY OF THE INVENTION

In accordance with at least one embodiment, a network switch, in response to receipt from a source station of a Layer 2 reservation request, establishes a reservation for capacity of an ingress queue of the network switch for a data flow of the source station. In response to a queue overrun condition on the ingress queue of the network switch while the reservation is active, the network switch preserves data frames in the data flow of the source station transmitted pursuant to the reservation and discards other data frames.

BRIEF DESCRIPTION OF THE DRAWINGS

FIG. 7 illustrates an exemplary Link Layer Discovery Protocol (LLDP) frame that can be utilized to implement a QRsv communication between a host and a switch and between switches in accordance with one embodiment;

FIG. 8 depicts an exemplary QRsv request TLV that may be sent by a host to a switch in a LLDP data frame serving as a QRsv request in accordance with one embodiment;

FIG. 9 illustrates an exemplary QRsv response TLV that may be sent by a switch to a host in a LLDP data frame serving as a QRsv response to a QRsv request in accordance with one embodiment;

FIG. 10 depicts an exemplary QRsv request TLV that may be forwarded by a switch to another switch in a LLDP data frame in order to request establishment of an end-to-end QRsv for a data flow of a source station in accordance with one embodiment.

DETAILED DESCRIPTION OF ILLUSTRATIVE EMBODIMENT

Disclosed herein are techniques for reserving ingress queue capacity in a network switch at Layer 2. Use of such reservations provide enhanced reliability of data communication without the high processing overhead associated with higher layer reservation protocols, such as RSVP.

Figure 1:
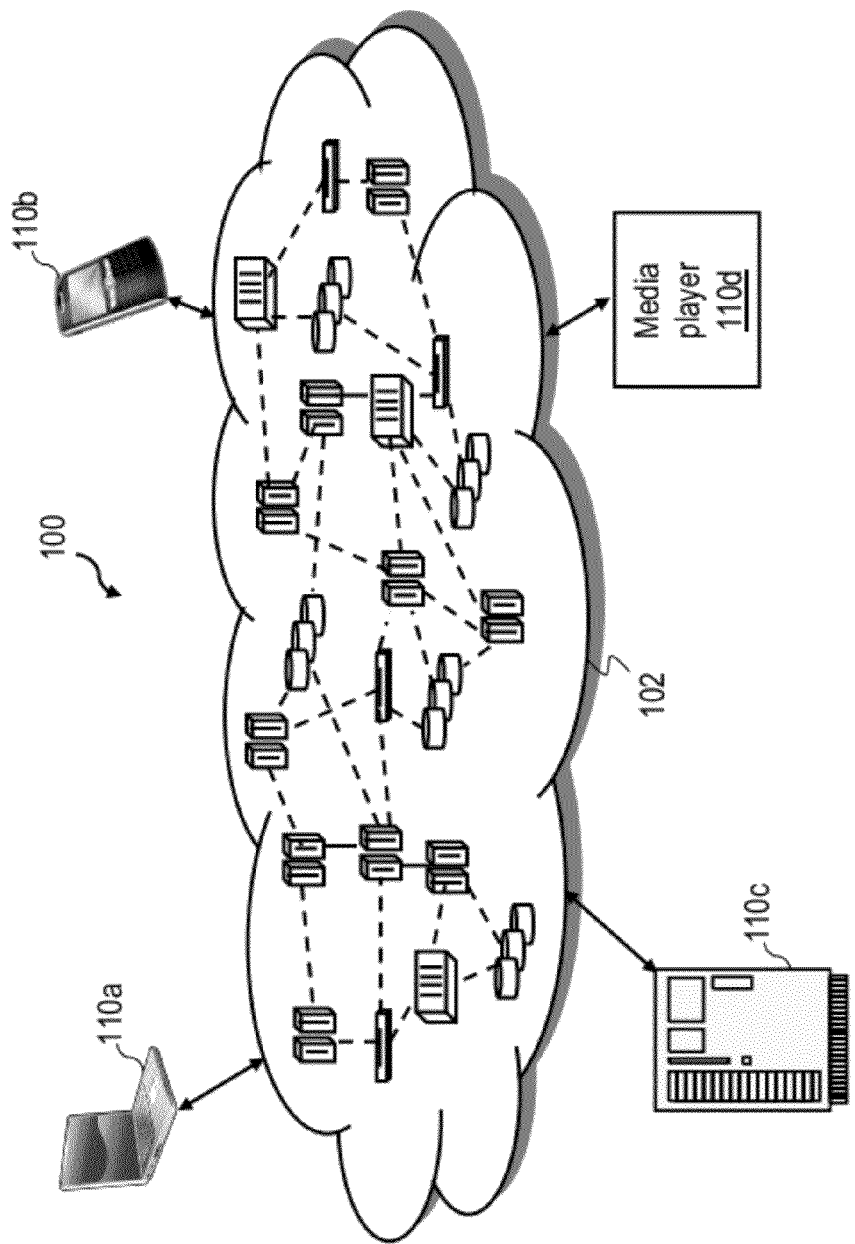
FIG. 1 is a high level block diagram of a data processing environment in accordance with one embodiment.

With reference now to the figures and with particular reference to FIG. 1, there is illustrated a high level block diagram of an exemplary data processing environment 100 in accordance within one embodiment. As shown, data processing environment 100 includes a collection of resources 102. Resources 102, which may include various hosts, clients, switches, routers, storage, etc., are interconnected for communication and may be grouped (not shown) physically or virtually, in one or more public, private, community, public, or cloud networks or a combination thereof. In this manner, data processing environment 100 can offer infrastructure, platforms, software and/or services accessible to various client devices 110, such as personal (e.g., desktop, laptop, netbook, tablet or handheld) computers 110a, smart phones 110b, server computer systems 110c and consumer electronics, such as media players (e.g., set top boxes, digital versatile disk (DVD) players, or digital video recorders (DVRs)) 110d. It should be understood that the types of client devices 110 shown in FIG. 1 are illustrative only and that client devices 110 can be any type of electronic device capable of communicating with and accessing resources 102 via a packet network.

Figure 2:
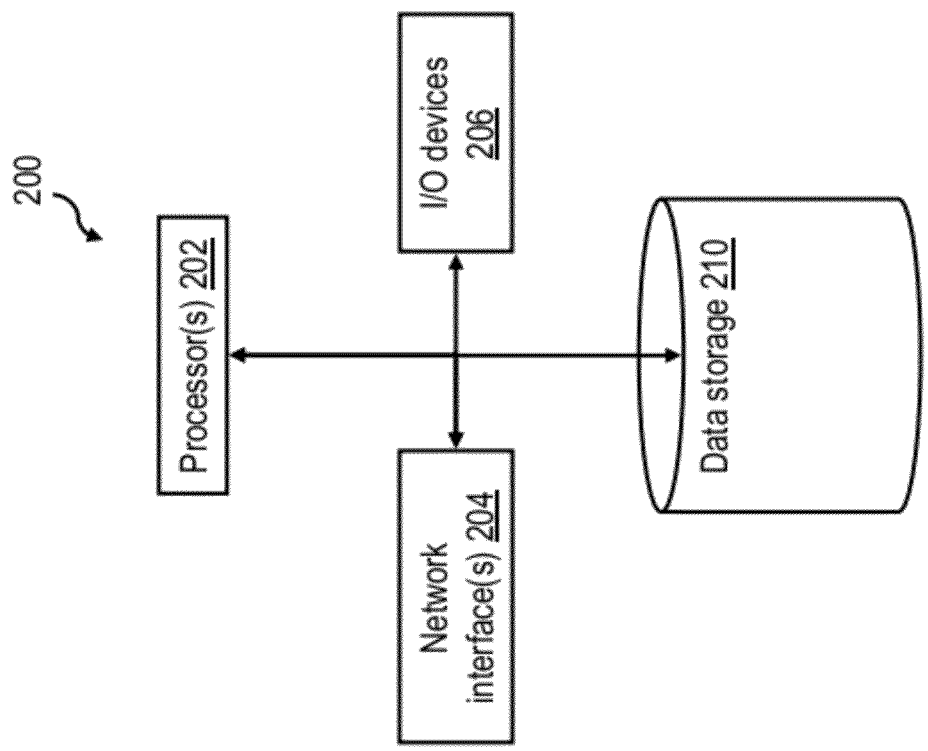
FIG. 2 is a high level block diagram of a data processing system in accordance with one embodiment.

Referring now to FIG. 2, there is illustrated a high level block diagram of an exemplary data processing system 200 that can be utilized to implement a physical host among resources 102 or a client device 110 of FIG. 1. In the illustrated exemplary embodiment, data processing system 200 includes one or more network interfaces 204 that permit data processing system 200 to communicate with one or more computing resources 102 via cabling and/or one or more wired or wireless, public or private, local or wide area networks (including the Internet). Data processing system 200 additionally includes one or more processors 202 (typically comprising one or more integrated circuits) that process data and program code, for example, to manage, access and manipulate data or software in data processing environment 100. Data processing system 200 also includes input/output (I/O) devices 206, such as ports, displays, user input devices and attached devices, etc., which receive inputs and provide outputs of the processing performed by data processing system 200 and/or other resource(s) in data processing environment 100. Finally, data processing system 200 includes data storage 210, which may include one or more volatile or non-volatile storage devices, including memories, solid state drives, optical or magnetic disk drives, tape drives, etc. Data storage 210 may store, for example, program code (including software, firmware or a combination thereof) that when executed by processor(s) 202 causes data processing system 200 to implement at least some of the functionality described herein.

Figure 3:
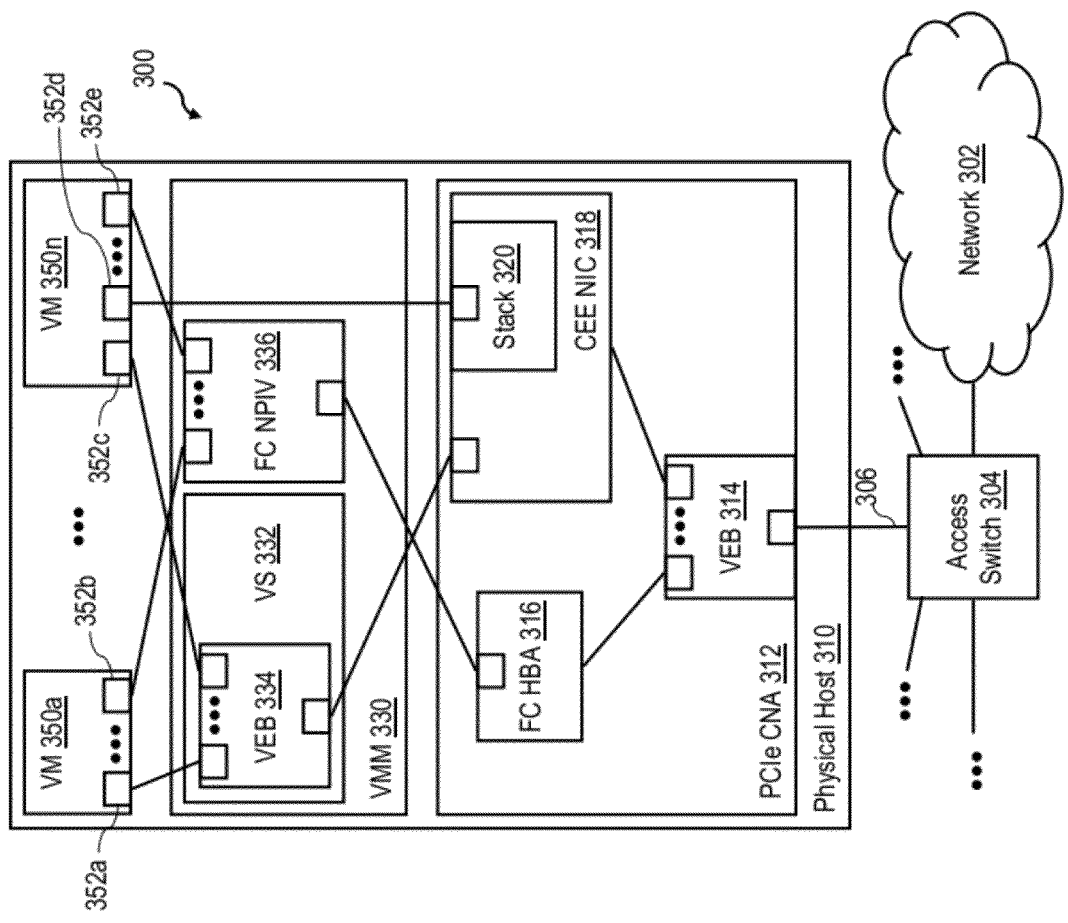
FIG. 3 is a high level block diagram of a portion of a data processing environment employing virtualization in accordance with one embodiment.

Referring now to FIG. 3, there is depicted a high level block diagram of a portion of a data processing environment 300 including a physical host 310 employing virtualization in accordance with one embodiment. For example, data processing environment 300 can implement a portion of data processing environment 100 of FIG. 1, and physical host 310 can implement one of resources 102 or a client device 110.

In the depicted embodiment, data processing environment 300 includes a network 302, which may include one or more wired or wireless local area networks (LANs) or wide area networks (WANs), such as the Internet. Connected to network 302 is an access switch 304 providing OSI Layer 2 connectivity to network 302 for one or more physical hosts including physical host 310, which is connected to access switch 304 by a physical link 306. As will be appreciated, physical link 306 has a finite available bandwidth, which is generally determined by access switch 304 and physical host 310 either based upon their communication capabilities or by protocol-dependent negotiation.

Physical host 310 of FIG. 3 can be implemented, for example, utilizing a data processing system 200 as depicted in FIG. 2. For example, in the depicted example, network interface(s) 204 of physical host 310 include a Peripheral Component Interconnect Express (PCIe) Converged Network Adapter (CNA) 312. In the depicted embodiment, PCIe CNA 312 includes a Virtual Ethernet Bridge (VEB) 314 coupled to physical link 306, as well as support for a plurality of diverse OSI Layer 2 networks. Thus, in this example, PCIe CNA 312 includes at least a Fibre Channel Host Bus Adapter (FC HBA) 316 and a Converged Enhanced Ethernet (CEE) Network Interface Card (NIC) 318.

Physical host 310 executes a Virtual Machine Monitor (VMM) 330, which virtualizes and manages the resources of physical host 310. VMM 330 supports the execution of one or more (and potentially thousands of) VMs, which in the depicted example include VMs 350a-350n. In the depicted embodiment, each of VMs 350 has at least one (and in some cases multiple) of virtual network interfaces 352a-352e, which provide network connectivity at least at Layer 2 of the OSI model.

As depicted, VMM 330 provides one or more (and in the depicted embodiment, at least two) virtual networks to which its VMs 350 can attach. For example, in the depicted embodiment, VMM 330 provides a first virtual Layer 2 network through the implementation of a virtual switch (VS) 332 including a VEB 334. VMM 330 similarly provides a second virtual network through the implementation of FC N_Port Identifier Virtualization (FC NPIV) 336. In various embodiments, each of the virtual networks supported by VMM 330 can be, for example, a private network of a particular party, a collaborative private network shared by multiple parties, or a public network.

In the depicted example, network interface 352a of VM 350a is connected via VEB 334 to the first virtual network, and network interface 352b of VM 350a is connected to the second virtual network via FC NPIV 336. Similarly, network interface 352c of VM 350n is connected via VEB 334 to the first virtual network, and network interface 352e of VM 350n is connected to the second virtual network via FC NPIV 336. VM 350n includes an additional network interface 352d that bypasses the virtual networks supported by VMM 330 (and the concomitant overhead) and is connected via VMM 330 directly to a stack 320 provided as a "virtual function" of CEE NIC 318. As further shown in FIG. 3, FC NPIV 336 is connected to FC HBA 316 of PCIe CAN 312, and VEB 334 of VS 332 is connected to CEE NIC 318. The traffic of FC HBA 316 and CEE NIC 318 converge at VEB 314 of PCIe CNA 312.

As discussed further below, physical host 310 and network switches such as access switch 304 collaborate to improve reliability of data communication by reserving bandwidth of at least access switch 304 at Layer 2.

Figure 4:
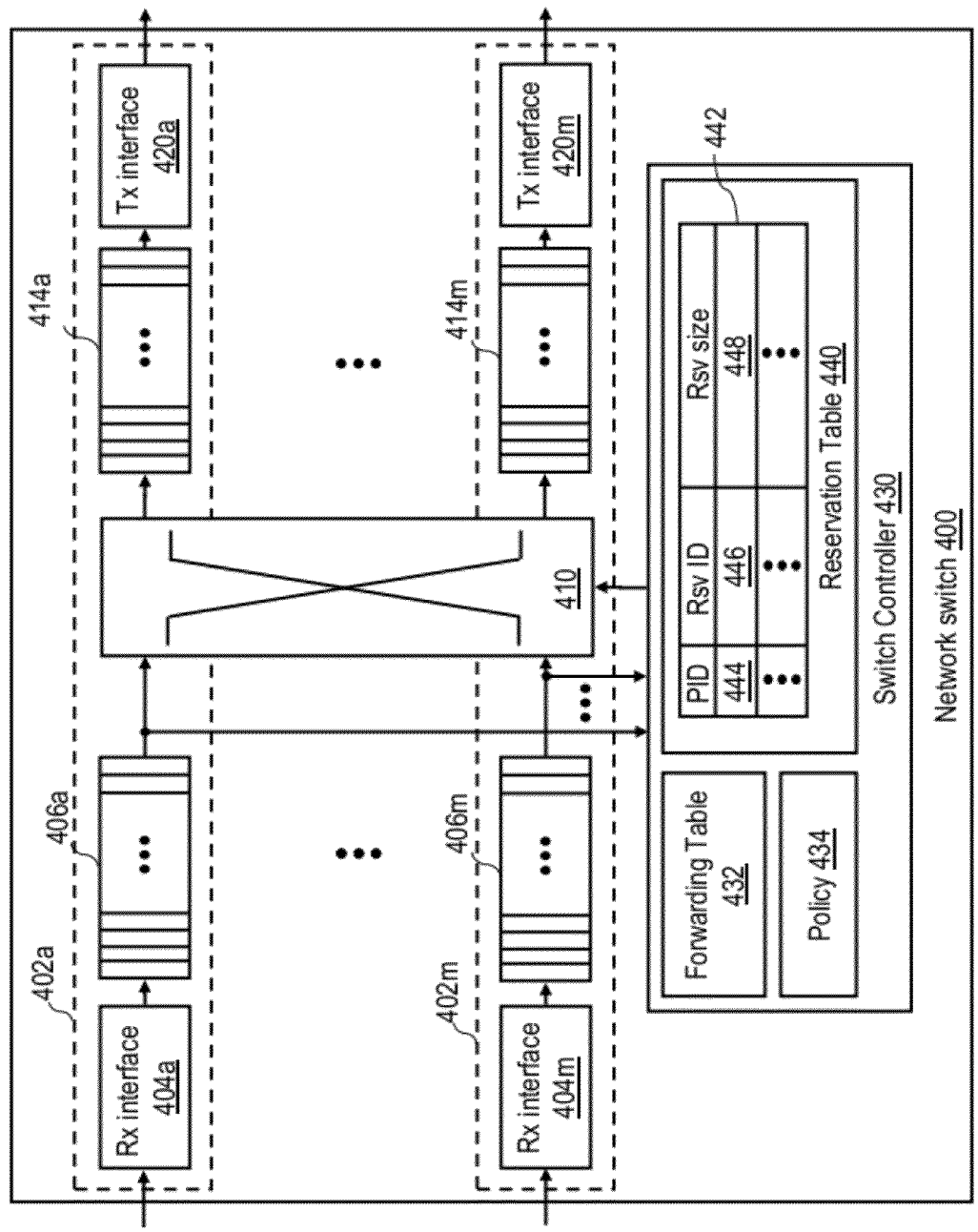
FIG. 4 is a high level block diagram of an exemplary embodiment of a Layer 2 network switch in accordance with one embodiment.

Referring now to FIG. 4, there is depicted a high level block diagram of an exemplary embodiment of a Layer 2 network switch 400, such as access switch 304 of FIG. 3. A virtual switch, such VS 332, may also be structured similarly, with the depicted ports and queue structures implemented in data storage of a host rather than a physical network switch.

As shown, network switch 400 includes a plurality of ports 402a-402m. Each port 402 includes a respective one of a plurality of receive (Rx) interfaces 404a-404m and a respective one of a plurality of ingress queues 406a-406m that buffers data frames received by the associated Rx interface 404. Each of ports 402a-402m further includes a respective one of a plurality of egress queues 414a-414m and a respective one of a plurality of transmit (Tx) interfaces 420a-420m that transmit data frames from an associated egress queue 414.

Network switch 400 includes a crossbar 410 that intelligently switches data frames from any of ingress queues 406a-406m to any of egress queues 414a-414m under the direction of switch controller 430. In order to intelligently switch data frames, switch controller 430 learns from observed data frames an association between ports and destination MAC addresses specified by the data frames, records the learned associations between destination MAC addresses and ports 402 in entries of a forwarding table 432, and then controls crossbar 410 to switch data frames in accordance with the associations recorded in forwarding table 432. Switch controller 430 may also include a policy module 434 that implements a desired policy management and enforcement for data frames that satisfy predetermined criteria.

As discussed previously, if the arrival rate of data frames at a given Rx interface 404 of network switch 400 overruns the capacity of the associated ingress queue 406 to buffer the incoming data frames, the excess data frames are silently discarded. Overrun of ingress queues 406 is particularly an issue in virtualized environments, such as data processing environment 300 of FIG. 3, in which multiple (and possibly numerous) VMs 350 may independently and concurrently transmit data to the same port 402 of a network switch 400.

To reduce the overrun of ingress queues 406 and thereby improve data communication reliability, network switch 400 preferably supports the reservation of capacity in ingress queues 406 for particular data flows. In particular, as described further below with reference to FIGS. 5-6, switch controller 430 supports the ability of a source station (e.g., a network adapter (e.g., PCIe CNA 312 of FIG. 3), a driver for a network adapter, a control program (e.g., an operating system or VMM 330), a virtual machine (e.g., a VM 350) or an application program) to request the reservation of capacity in an ingress queue 406 of one or more network switches 400 interposed between the source station and a destination station for one of its data flows. The switch controller 430 of the network switch(es) 400 then grants or denies the reservation request, for example, based on one or more factors, such as the number of data flows, the amount of ingress queue capacity already reserved, and by policy considerations indicated by policy module 434. If granted, switch controller 430 records the reservation in reservation data structure, for example, in an entry 442 of a reservation table 440. As indicated, in one embodiment, each entry 442 of reservation table 440 may include, for example, a port ID (PID) field 444 identifying the port 402 in which bandwidth is reserved, a reservation (Rsv) ID field 446 identifying, for example, by source MAC address and/or flow ID, the data frames for which ingress queue capacity is to be reserved, and a reservation (Rsv) size field 448 indicating an amount of ingress queue capacity (e.g., expressed as a number of ingress queue entries, a percentage of ingress queue capacity and/or a total volume of data) reserved for data frames of the data flow associated with the reservation ID. In this manner, frames of a data flow having reserved ingress queue capacity on a network switch 400 will not be dropped in the case of an ingress queue overrun condition as long as the data rate of the data flow is less than or equal to the reserved capacity. Instead, data frames of other data flows either lacking a ingress queue capacity reservation or exceeding their reserved ingress queue capacities will be dropped.

Figure 5:
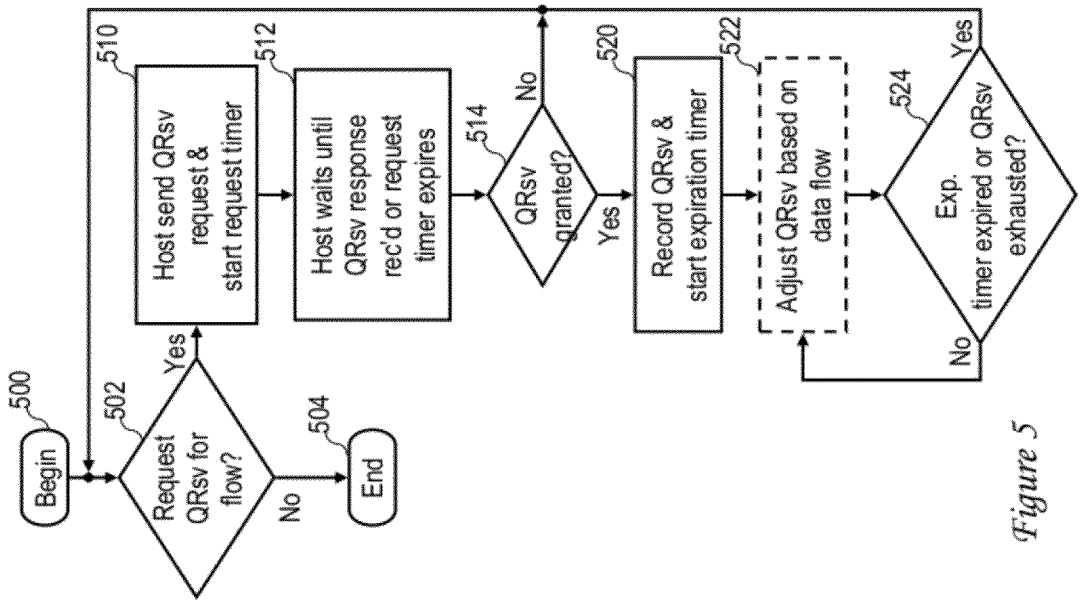
FIG. 5 is a high level logical flowchart of an exemplary process by which a host reserves ingress queue capacity of a virtual or physical switch in accordance with one embodiment.

With reference now to FIG. 5, there is illustrated a high level logical flowchart of an exemplary process by which a host, such as physical host 310 of FIG. 3, reserves ingress queue capacity of a switch, such as network switch 400 of FIG. 4 in accordance with one embodiment. The illustrated process may be performed, for example, by source station, such as a network adapter (e.g., PCIe CAN 312 of FIG. 3), a driver for a network adapter, a control program (e.g., an operating system or VMM 330), a virtual machine (e.g., a VM 350) or an application program. For generality, all such embodiments are referred to the operation of the "host" on which the source station resides.

The process of FIG. 5 begins at block 500 and then proceeds to block 502, which illustrates a host determining whether or not to request a reservation of ingress queue capacity (hereinafter, referred to as a QRsv) for a data flow of the host. The host may make the determination depicted at block 502 based, for example, on an expected bandwidth of the data flow, the type of data, the tolerance of the data flow for frame loss, and/or the number of other data flows sharing the same ingress queue, etc. In response to a determination at block 502 to not request a QRsv for the data flow, the process ends at block 504. Consequently, the host will transmit the data flow to the destination station of the data flow without benefit of an ingress queue reservation at any of the switches in the data path between the host and the destination station, with the attendant risk of data frame loss due to ingress queue overrun.

Returning to block 502, in response to the host determining to request a QRsv for the data flow, the process proceeds from block 502 to block 510. Block 510 depicts the host sending a QRsv request for a data flow to a network switch in the data path between the host and a destination station. The QRsv request preferably identifies the data flow with a Rsv ID. If the data flow associated with the QRsv request comprises all data transmitted by a given source station, the Rsv ID may simply be the source MAC address of the source station. If, on the other hand, the QRsv request is for only one of possibly multiple data flows of a given source station, then the Rsv ID may comprise the source MAC address of the source station, as well as an additional flow ID. In either case, the QRsv request preferably indicates an amount of ingress queue capacity to be reserved for the data flow and may further indicate a total volume (or quantity) of data to be transmitted under the QRsv. As discussed further below, in a preferred embodiment the QRsv request is communicated utilizing an Layer 2 protocol, such as the Link Layer Discovery Protocol (LLDP) defined by the IEEE 802.1AB specification, which is incorporated herein by reference. As further indicated at block 510, the host may additionally start a request timer defining a window in which the QRsv request is to be granted or denied.

Following block 510, the host waits, as depicted at block 512, until a QRsv response granting or denying the request is received by the host or until the request timer expires. The host then determines at block 514 whether or not the requested QRsv was granted within the window defined by the request timer. If not, the process returns to block 502, which has been described. If, however, the host determines at block 514 that the QRsv request was granted, the process proceeds to block 520, which depicts the host locally recording its QRsv (e.g., in a table entry similar to reservation table entry 442 of FIG. 4). In addition, the host may optionally start an expiration timer tracking a duration of the QRsv, where the initial expiration timer value may be determined, for example, by a default QRsv duration or based on a timer value specified by the QRsv response. At this point, data frames of the data flow transmitted by the host via the switch(es) in which ingress queue capacity is reserved are guaranteed to not be dropped in response to an ingress queue overrun condition.

As indicated at block 522, during the transmission of the data frames comprising the data flow, the host may optionally increase or decrease its QRsv by renegotiating with one or more network switches in the data path between the source and destination stations. The host may adjust the bandwidth reserved by the QRsv, for example, based at least in part on the actual data rate of the data flow. At block 524, the host determines whether or not the expiration timer for the QRsv has expired or if a total permissible volume of data transmitted under the QRsv has been exhausted. If not, the process returns to optional block 522, which has been described. If, however, the host determines at block 524 that the QRsv has expired or has been exhausted, the process returns to previously described block 502, indicating that, if desired, the host can request renewal of the QRsv for the data flow.

Figure 6:
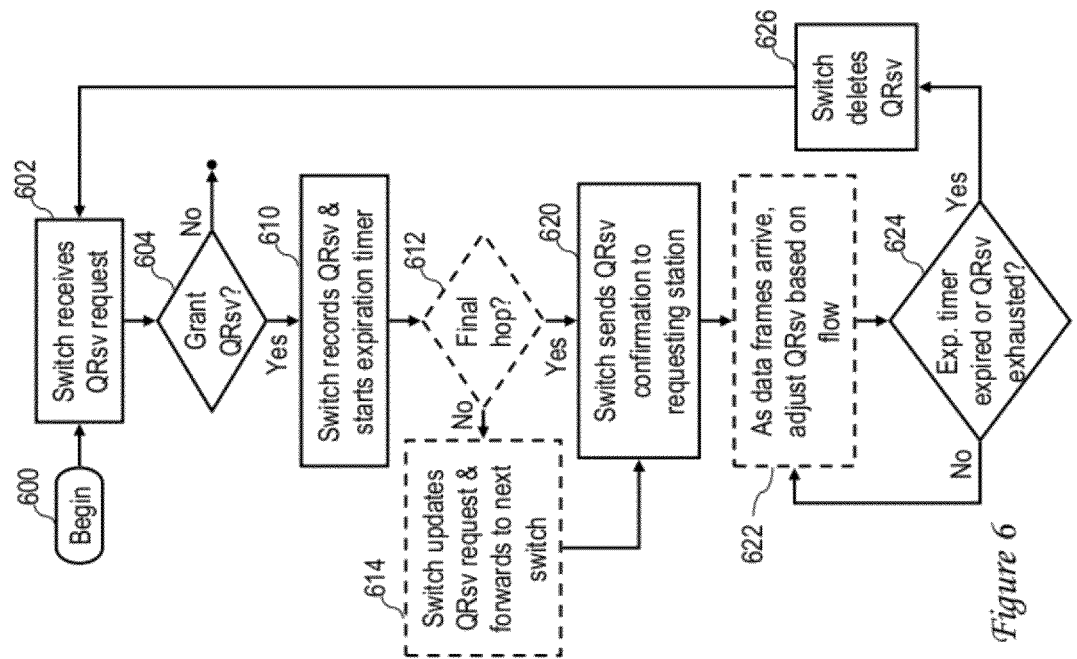
FIG. 6 is depicted a high level logical flowchart of an exemplary process by which a virtual or physical switch reserves ingress queue capacity for the data flow of a host in accordance with one embodiment.

Referring now to FIG. 6, there is depicted a high level logical flowchart of an exemplary process by which a physical network switch, such as network switch 400 of FIG. 4, or a virtual switch reserves ingress queue capacity for the data flow of a source station in accordance with one embodiment. In one embodiment, the depicted process is implemented in hardware, such as switch controller 430, which may implement the process in integrated circuitry with or without the execution of software and/or firmware.

As shown, the process begins at block 600 and then proceeds to block 602, which depicts the switch receiving a Layer 2 QRsv request from a host to which a port of the switch is coupled by a network link. As indicated above, the QRsv request preferably identifies the data flow with a Rsv ID, such as a source MAC address and/or a flow ID, and additionally indicates an amount of ingress queue capacity to be reserved for the data flow and may further indicate a volume of data to be transmitted under the QRsv.

In response to receipt of QRsv request at block 602, the switch determines at block 604 whether or not to grant the QRsv request based, for example, on the total available bandwidth of the relevant ingress queue 406, the amount (data rate and/or volume) of the requested QRsv, the other QRsys, if any, currently active for the relevant ingress queue 406, and/or the number of other data flows on the same port 402. In response to a determination at block 604 to deny the QRsv request, the switch may optionally send a QRsv response explicitly denying the QRsv request or may simply silently discard the QRsv request, thus permitting the request timer of the requesting host to time out, as previously described with reference to blocks 512-514 of FIG. 5. In either case, the process of FIG. 6 returns from block 604 to block 602, which has been described.

If, however, the switch determines at block 604 that the QRsv of the host can and should be granted, the switch records the QRsv, for example, in a reservation table entry 442 of reservation table 440. In addition, the switch may start an expiration timer defining the duration of the QRsv, as previously described with reference to block 520 of FIG. 5. In embodiments in which a host is permitted to or requests to establish a QRsv for its data flow in only the switch most proximate to the source station, the process proceeds from block 610 to block 620, which is described below. In other embodiments in which a host is permitted to and requests to establish a QRsv for its data flow in more than one switch in the data path between the source and destination stations, the process passes to block 612.

Block 612 depicts the switch determining whether or not the switch is the final hop in the data path between the source and the destination stations, that is, determining whether the destination station is connected by a data link to a port of the switch without any intervening switches. If so, the process proceeds to block 620, which is described below. If not, the process passes to block 614, which illustrates the switch updating the source MAC address of the QRsv request to that of the switch and forwarding the QRsv request to the next switch in the data path to the destination station of the data flow, where the QRsv request will also be processed as shown in FIG. 6. The process then proceeds from block 614 to block 620.

Block 620 depicts the switch sending to the requesting station from which the QRsv request was received a QRsv confirmation that confirms grant of the requested QRsv. The QRsv confirmation preferably is indicative of a data rate reserved for the data flow, a total permissible volume of data that may be transmitted under the QRsv, and/or a duration of the reservation. As indicated at block 622, during the transmission of the data frames comprising the data flow, the switch may optionally increase or decrease the QRsv for the data flow by renegotiating with the source station. The switch may adjust the bandwidth reserved by the QRsv, for example, based at least in part on the actual data rate of the data flow, the bandwidth reserved by other data flows, and/or QRsv requests denied by the switch for lack of capacity. At block 624, the switch determines whether or not the expiration timer for the QRsv has expired or if a total permissible volume of data transmitted under the QRsv has been exhausted. If not, the process returns to optional block 622, which has been described. If, however, the host determines at block 624 that the QRsv has expired or has been exhausted, the switch removes the reservation table entry 442 for the QRsv from reservation table 430 (block 626), and the process returns to previously described block 602, indicating that, if requested, the switch can renew a QRsv for the data flow.

With reference now to FIG. 7, there is depicted LLDP frame (also referred to as a LLDP data unit (LLPDDU)) 700 as defined by IEEE 802.1AB that can be utilized to implement a Layer 2 QRsv communication between a host and a switch and between switches in accordance with one embodiment. In the depicted embodiment, LLDP frame 700 includes a preamble field 700 followed by a destination MAC address field 702. In cases in which a host requests a QRsv at only the most proximate switch to the source station (either by choice or because of implementation constraints), destination MAC address field 702 preferably specifies the default address of the nearest bridge (i.e., 01:80:C2:00:00:0 E). In other cases in which the host requests establishment of a QRsv at all switches in the data path between the source and destination stations, destination MAC address field 702 preferably indicates the destination MAC address of the destination station to which the data flow is to be sent.

LLDP frame 700 additionally includes a source MAC address field 704 identifying the MAC address of the source station, an Ethertype field 704 containing the Ethertype (i.e., 0x88CC) assigned for LLDP, and the three mandatory (under LLDP) Chassis ID, Port ID and Time-to-Live (TTL) Type, Length, Value (TLV) fields 706, 708 and 710, respectively. Following TLVs mandated by LLDP, optional TLV field 712 specifies a QRsv-related TLV utilized to request or grant/deny a QRsv, as described in greater detail below with reference to FIGS. 8-10.

Referring now to FIG. 8, there is depicted an exemplary QRsv request TLV 800 that may be sent by a host to a switch in a LLDP data frame 700 serving as a QRsv request in accordance with one embodiment. QRsv request TLV 800 includes a TLV header comprising a type field 800 indicating by a value of 127 that QRsv request TLV 800 is a custom TLV and a length field 802 specifying a length of QRsv request TLV 800 in octets. In the depicted example, length field 802 specifies a length of 14 octets if the switch is to consider all traffic of the source station as a single unified data flow and specifies a length of 30 octets if the switch is requested to independently handle reservations for one of the multiple data flows of the source station.

QRsv request TLV 800 additionally includes a TLV information string including an organizationally unique identifier (OUI) field 804 uniquely identifying the organization promulgating the TLV, an organizationally defined subtype field 806 indicating an organizationally defined subtype of the TLV, and an organizationally defined information string 808. In the depicted example of organizationally defined subtype field 806, a subtype of 1 is specified for a QRsv request for a single unified data flow of the source station directed only at the switch proximate to the source station, a subtype of 3 is specified for a QRsv request requesting an end-to-end QRsv for a single unified data flow of the source station at all switches in the data path between the source and destination stations, a subtype of 11 is specified for a QRsv request for a one of multiple data flows of the source station only at the switch proximate to the source station, and a subtype of 13 is specified for a QRsv request requesting an end-to-end QRsv for a one of multiple data flows of the source station at all switches in the data path between the source and destination stations. Further, in the depicted example, organizationally defined information string 808 indicates the LLDP frame 700 containing QRsv request TLV 800 is a QRsv request and specifies a number of bytes and frames (i.e., the traffic volume) for which a QRsv is requested. Additionally, if a switch is to separately handle QRsys for multiple data flows of the source station, organizationally defined information string 808 uniquely identifies for which one of the multiple data flow of the source station the QRsv is requested.

With reference now to FIG. 9, there is illustrated an exemplary QRsv response TLV 900 that may be sent by a switch to a host in a LLDP data frame 700 serving as a QRsv response in accordance with one embodiment. In the containing LLDP data frame 700, source and destination MAC address fields 702 and 704 specify the MAC address of the originating switch and source station, respectively.

QRsv response TLV 900 includes a TLV header comprising a type field 900 indicating by a value of 127 that QRsv response TLV 900 is a custom TLV and a length field 902 specifying a length of QRsv request TLV 900 in octets. In the depicted example, length field 902 specifies a length of 18 octets if QRsv response originates from the switch proximate to the source station and responds to a request for a QRsv for the unified data flow of the source station, specifies a length of 14 octets if the QRsv response originates from the far end switch proximate to the destination station and responds to a request for a QRsv for the unified data flow of the source station, specifies a length of 32 octets if the QRsv response originates from the switch proximate the source station and responds to a request for a QRsv for one of multiple data flows of the source station, and specifies a length of 34 octets if the QRsv response originates from the far end switch proximate to the destination station and responds to a request for a QRsv for one of multiple data flows of the source station.

QRsv request TLV 900 additionally includes a TLV information string including an organizationally unique identifier (OUI) field 904 uniquely identifying the organization promulgating the TLV, an organizationally defined subtype field 906 indicating an organizationally defined subtype of the TLV, and an organizationally defined information string 908. In the depicted example of organizationally defined subtype field 906, a subtype of 2 is specified if the QRsv response originates from the switch proximate to the source station and responds to a request for a QRsv for the unified data flow of the source station, specifies a subtype of 5 if the QRsv response originates from the far end switch proximate to the destination station and responds to a request for a QRsv for the unified data flow of the source station, specifies a subtype of 12 if the QRsv response originates from the switch proximate the source station and responds to a request for a QRsv for one of multiple data flows of the source station, and specifies a subtype of 15 if the QRsv response originates from the far end switch proximate to the destination station and responds to a request for a QRsv for one of multiple data flows of the source station.

In the depicted example, organizationally defined information string 908 indicates the LLDP frame 700 containing QRsv response TLV 900 is a QRsv response and specifies a number of bytes and frames (i.e., a traffic volume) for which the QRsv is granted, as well as an expiration timer value for the QRsv. If QRsv response TLV 900 is intended to indicate denial of the requested QRsv, the bytes and frames specified by organizationally defined information string 908 will be zero. Additionally, if the switch is to separately handle QRsys for multiple data flows of the source station, organizationally defined information string 808 uniquely identifies for which one of the multiple data flow of the source station the QRsv is granted or denied.

Referring now to FIG. 10, there is depicted an exemplary QRsv request TLV 1000 that may be forwarded by a switch to another switch in a LLDP data frame 700 in order to request establishment of an end-to-end QRsv for a data flow of a source station in accordance with one embodiment. QRsv request TLV 1000 includes a TLV header comprising a type field 1000 indicating by a value of 127 that QRsv request TLV 1000 is a custom TLV and a length field 1002 specifying a length of QRsv request TLV 1000 in octets. In the depicted example, length field 802 specifies a length of 18 octets if the switches in the data path between the source and destination stations are to consider all traffic of the source station as a single unified data flow and specifies a length of 34 octets if the switch in the data path between the source and destination stations are requested to separately handle reservations for one of the multiple data flows of the source station.

QRsv request TLV 1000 additionally includes a TLV information string including an organizationally unique identifier (OUI) field 1004 uniquely identifying the organization promulgating the TLV, an organizationally defined subtype field 1006 indicating an organizationally defined subtype of the TLV, and an organizationally defined information string 1008. In the depicted example of organizationally defined subtype field 1006, a subtype of 4 is specified for a QRsv request requesting an end-to-end QRsv for a single unified data flow of the source station and a subtype of 14 is specified for a QRsv request requesting an end-to-end QRsv for a one of multiple data flows of the source station. Further, in the depicted example, organizationally defined information string 1008 indicates the LLDP frame 700 containing QRsv request TLV 1000 is a QRsv grant and specifies a number of bytes and frames (i.e., the traffic volume) for which the QRsv is requested as well as a duration for which the QRsv will be provided. If QRsv request TLV 1000 is intended to indicate denial of the requested QRsv by the forwarding switch or a preceding switch, the bytes and frames specified by organizationally defined information string 1008 will be zero. Additionally, if the switch is to separately handle QRsys for multiple data flows of the source station, organizationally defined information string 1008 uniquely identifies for which one of the multiple data flow of the source station the QRsv is granted or denied.

Figure 11:
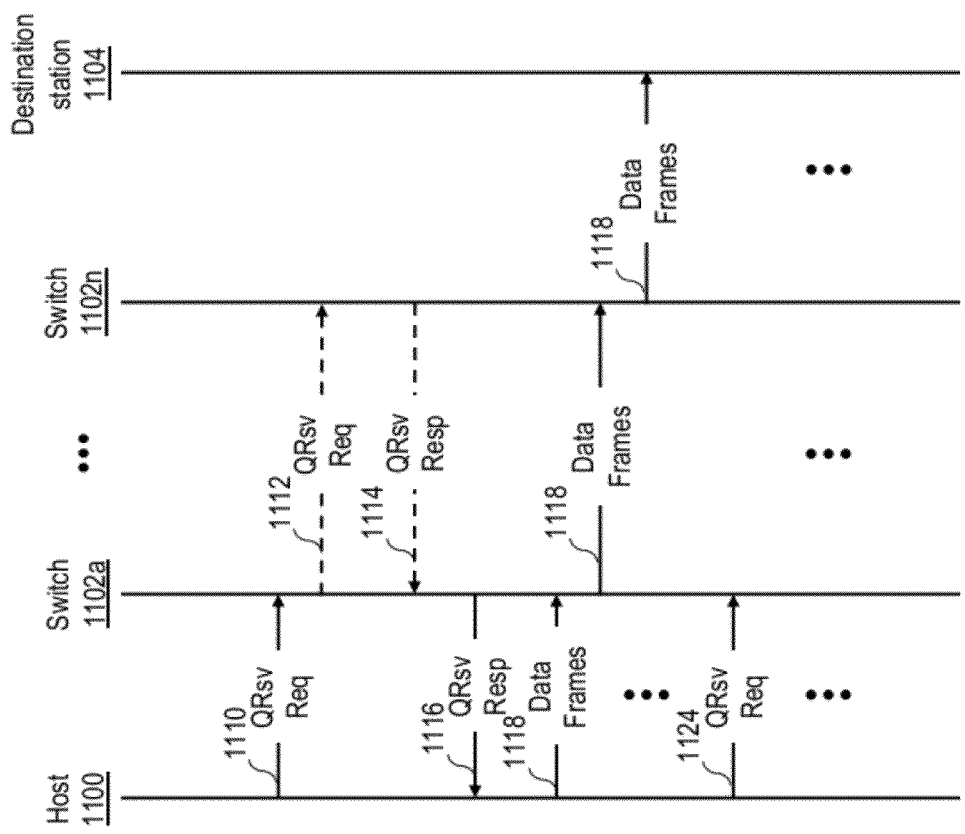
FIG. 11 is a time-space diagram depicting one example of the establishment and utilization of a QRsv at Layer 2 in accordance with one embodiment.

With reference now to FIG. 11, there is illustrated a time-space diagram depicting one example of the establishment and utilization of a QRsv at Layer 2 in accordance with one embodiment. In the depicted example, a host 1110 intends to transmit data frames via multiple Layer 2 switches 1102 to a destination station 1104. Switches 1102a-1102n include at least a near end switch 1102a most proximate to the source station/host and a far end switch 1102n most proximate to destination station 1104.

The process begins with a source station (e.g., a network adapter, a driver for a network adapter, a control program such as an operating system or VMM, a virtual machine or an application program) at a host 1100 transmitting a QRsv request, for example, a LLDP 700 including a QRsv request TLV 800. As described above, QRsv request 1110 can request a QRsv at only the most proximate switch 1102a to host 1100 or an end-to-end QRsv at all switches 1102a-1102n between host 1100 and destination station 1104.

If QRsv request 1110 requests a QRsv at only switch 1102a, then switch 1102a responds to QRsv request 1110 with a QRsv response 1116 (e.g., a LLDP 700 with a QRsv response 900) either granting or denying the requested QRsv. If, on the other hand, QRsv request 1110 requests an end-to-end QRsv at all switches 1102a-1102n in the data path between host 1100 and destination station 1104, then a QRsv request 1112 (e.g., a LLDP 700 including a QRsv request TLV 1000) is forwarded by switch 1102a and subsequent switches 1102 until switch 1102n is reached. In this case, switch 1102n responds to QRsv request 1112 with a QRsv response 1114 (e.g., an LLDP 700 including an appropriately configured QRsv response TLV 900), which is forwarded by switches 1102n through 1102a and supplied to host 1100 as QRsv response 1116.

Host 1100 then transmits data frames 1118 of a data flow to destination station 1104 via switches 1102a-1102n. Assuming that the QRsv request was granted, at least switch 1102a (and in some cases, all of switches 1102a-1102n) provide guaranteed service to data frames within the data flow up to the data rate, data amount and duration parameters agreed upon in the QRsv. Thus, if for example, switch 1102a experiences an ingress queue overrun condition on the port on which host 1100 has a reservation while the reservation is active, switch 1102a will preserve data frames 1118 and discard other frames in order to honor the reservation of host 1100. Following exhaustion or expiration of the QRsv, host 1100 may again request a QRsv for the data flow, as indicated by QRsv request 1124.

As has been described, in some embodiments, a network switch, responsive to receipt from a source station of a Layer 2 reservation request, establishes a reservation for capacity of an ingress queue of the network switch for a data flow of the source station. In response to a queue overrun condition on the ingress queue of the network switch while the reservation is active, the network switch preserves data frames in the data flow of the source station transmitted pursuant to the reservation and discards other data frames, such that the source station enjoys guaranteed forwarding by the network switch for its data flow despite an ingress queue overrun condition. In various embodiments, the reservation may be one of a plurality of reservations that the source station establishes for a plurality of data flows. Further, the reservation may be requested and established at each of a plurality of switches in the data path between the source and destination stations.

While the present invention has been particularly shown as described with reference to one or more preferred embodiments, it will be understood by those skilled in the art that various changes in form and detail may be made therein without departing from the spirit and scope of the invention. For example, although aspects have been described with respect to hosts and network switches executing program code (e.g., software, firmware or a combination thereof) that direct the functions described herein, it should be understood that embodiments may alternatively be implemented as a program product including a tangible machine-readable storage medium or storage device (e.g., an optical storage medium, memory storage medium, disk storage medium, etc.) storing program code that can be processed by a machine to cause the machine to perform one or more of the described functions. Further, although the present invention has been described with reference to the reservation of ingress queue capacity at Layer 2 in a physical network switch, it should be appreciated that the illustrated processes are equally applicable to the reservation of ingress queue capacity in a virtual switch, such as VS 332 of FIG. 3.

What is claimed is:

1. A method of data processing, comprising:
receiving a Layer 2 reservation request specified in a Link Layer Discovery Protocol (LLDP) frame;
in response to receipt from a source station of a Layer 2 reservation request, a network switch implemented in a physical platform establishing a reservation for capacity of an ingress queue of the network switch for a data flow of the source station; and
in response to a queue overrun condition on the ingress queue of the network switch while the reservation is active, the network switch preserving data frames in the data flow of the source station transmitted pursuant to the reservation and discarding other data frames.

2. The method of claim 1, wherein:
the data flow is one of a plurality of data flows of the source station; and
establishing a reservation includes establishing a respective one of a plurality of reservations for each of the plurality of data flows of the source station.

3. The method of claim 1, wherein:
the data flow is addressed to a destination station;
the network switch is one of a plurality of switches in a data path between the source station and the destination station; and
the establishing includes establishing the reservation at each of the plurality of switches in the data path.

4. The method of claim 1, wherein the Layer 2 reservation request identifies the data flow by a Layer 2 address and a flow identifier of the source station.

5. The method of claim 1, wherein establishing the reservation includes recording the reservation in a reservation data structure of the network switch.

6. The method of claim 1, and further comprising:
the network switch removing the reservation in response to expiration of timer.

7. The method of claim 1, and further comprising:
the network switch removing the reservation in response to exhaustion of a reserved data volume.

8. The method of claim 1, and further comprising:
the network switch modifying a reserved capacity in the ingress queue during the reservation.

9. The method of claim 1, and further comprising:
the source station transmitting the Layer 2 reservation request.

* * * * *